Patented Apr. 24, 1951

2,550,345

UNITED STATES PATENT OFFICE 2,550,345

SILVER PAINT

Robert B. Gray and Raymond H. Steele, Erie, Pa., assignors to Erie Resistor Corporation, Erie, Pa., a corporation of Pennsylvania No Drawing. Application May 10, 1945, Serial No. 593,094

5 Claims. (Cl. 260—29.1)

This invention is a metal paint for applying coatings to be fixed by heating or firing. Among its advantages are electrical conductivity permitting capacity measurement during application, dry film strength, freedom from bubble formation, and safety. Further objects and advantages appear in the specification and claims.

The paint comprises a pigment of precipitated silver oxide, a film forming vehicle holding the pigment in suspension, an antifoaming agent, such as ethyl alcohol, and a base of water or water alcohol mixtures. The vehicles are water or alcohol soluble protective colloids such as ethyl cellulose, polyvinyl alcohol, or purified dextrin. These when dried form films of sufficient strength to hold the pigment in place. If the paint is to be used for coating ceramic condensers, suitable amounts of ceramic flux are added to provide the necessary adherence after firing. The amount and character of flux varies with the surface to be coated. When wet the coating is electrically conductive making it particularly adaptable to the manufacture of condensers as disclosed in the application of Robert B. Gray, Serial No. 592,946, filed May 10, 1945, now abandoned.

The electrical conductivity can be increased by adding a substance increasing the hydrogen ion concentration. This substance, which should be compatible with the other constituents and soluble in the base, may be silver nitrate which should be added a short time before the paint is to be used. A water base is preferable for safety, low cost, and highest conductivity.

In use, the paint is conveniently applied by dipping or with a brush or roll. It has substantially no tendency to form bubbles which would break during firing and make pin holes in the coating. After drying, the coating is heated to convert the silver oxide to silver and make a uniform silver coating held in place by the flux. Before the coating is dried, it is electrically conductive but after drying the particles of pigment are insulated by the protective colloid.

Specific examples of the paint are as follows:

(1)

| | Per cent |
|---|---|
| Precipitated silver oxide | 50 |
| Ceramic flux | 2 to 10 |
| Polyvinyl alcohol | 2 |
| Ethyl alcohol | 2 to 4 |
| Water | Balance |

(2)

| | Percent |
|---|---|
| Precipitated silver oxide | 50 |
| Ceramic flux | 2 to 10 |
| Purified dextrin | 4 |
| Silver nitrate | 0 to 5 |
| Water | Balance |

The constituents do not react chemically but form a mixture in which each of the constituents functions substantially independently of the other constituents. The percentage of pigment depends upon the thickness of the coating to be applied. After heating or firing the pigment forms a uniform silver or silver alloy coating held in place by the ceramic flux. The remaining constituents are broken down during the firing. The amount of ceramic flux necessary depends upon the type of ceramic. The amount for any particular ceramic is well known. Other bonding agents may be used. The firing or baking temperature is primarily determined by the heat necessary to set the bonding agent. Firing is used to define the necessary setting heat.

The film forming vehicle (or protective colloid) holds the pigment in suspension and upon drying, holds the coating against the ceramic surface until the firing operation. The antifoaming agent is necessary with some vehicles but not with others. For example, the purified dextrin requires no anti-foaming agent. Each of the constituents acts independently and belongs to a class of materials having well known properties.

The constituents are chosen to have no harmful reaction. For example, silver nitrate attacks some vehicles, such as polyvinyl alcohol, but does not attack dextrin within the normal period of use. Chlorides should be avoided as these have a tendency to form silver chloride which is undesirable in the finished coating. These factors are well understood in the art.

Silver oxide, when dry, is explosive. A water base is therefore desirable from the standpoint of safety.

What we claim as new is:

1. A paint for producing a film having good electrical conductivity before drying and reduceable by firing after drying to a metallic silver film comprising silver oxide pigment, and an aqueous solution of a water soluble protective colloid holding the pigment in suspension.

2. A paint for producing a film having good electrical conductivity before drying and reduceable by firing after drying to a metallic silver film comprising silver oxide pigment, a ceramic flux, and an aqueous solution of a water soluble protective colloid holding the pigment in suspension.

3. A water base paint for producing a film having good electrical conductivity before drying and reduceable by firing after drying to a metallic silver film comprising a silver oxide pigment, an aqueous solution of a protective colloid, and a water soluble agent increasing the hydrogen ion concentration.

4. A water base paint for producing a film having good electrical conductivity before drying and reduceable by firing after drying to a metallic silver film comprising a pigment of silver oxide, a vehicle of polyvinyl alcohol, water, and an anti-foaming agent.

5. A water base paint for producing a film having good electrical conductivity before drying and reduceable by firing after drying to a metallic silver film comprising a pigment of silver oxide, a vehicle of purified dextrin, water, and silver nitrate.

ROBERT B. GRAY.
RAYMOND H. STEELE.

REFERENCES CITED

The following references are of record in the file of this patent:

UNITED STATES PATENTS

| Number | Name | Date |
|---|---|---|
| 2,280,135 | Ward | Apr. 21, 1942 |
| 2,385,580 | Knox | Sept. 25, 1945 |

FOREIGN PATENTS

| Number | Country | Date |
|---|---|---|
| 225,072 | Great Britain | Nov. 27, 1924 |
| 843,503 | France | July 5, 1939 |